Dec. 26, 1967    A. J. ALLEN    3,360,281
HITCH ASSEMBLY FOR TRACTOR-TRAILER UNIT
Filed Jan. 14, 1966
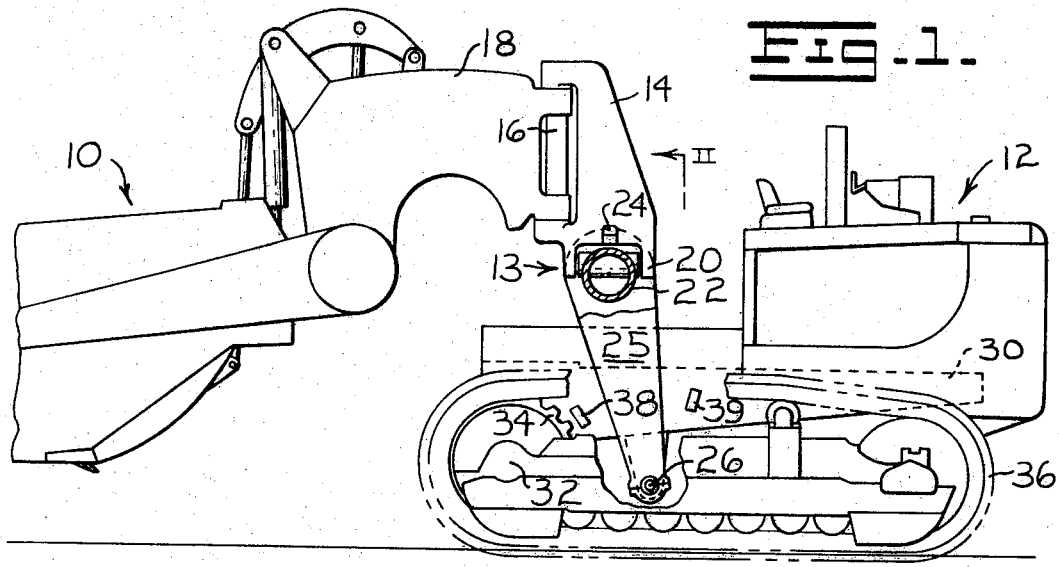
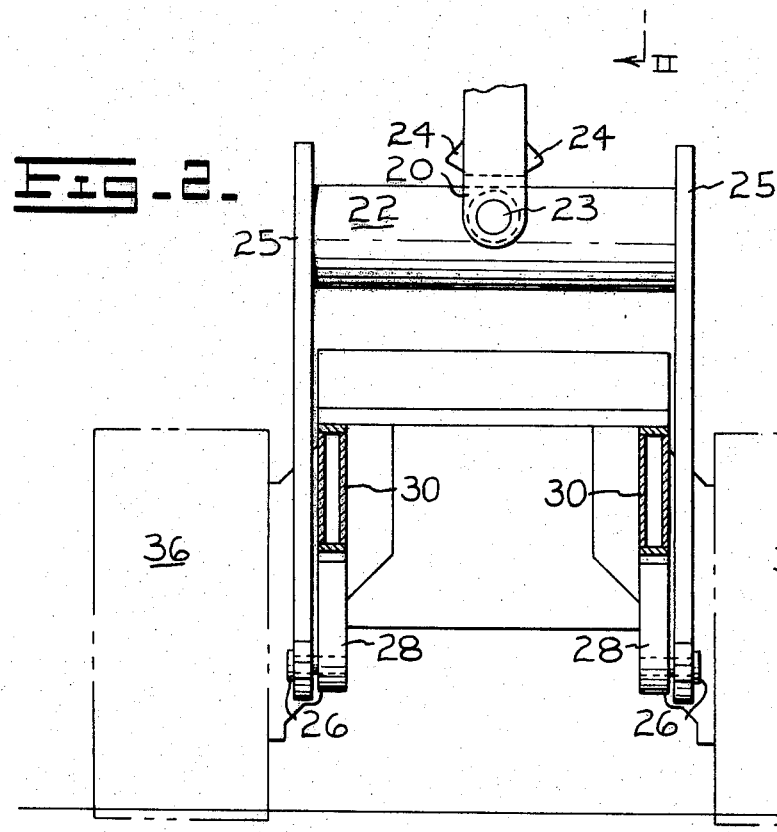
INVENTOR.
ANDREW J. ALLEN
BY
*Fryer, Tjensvold, Finn & Phillips*
ATTORNEYS 3,360,281
HITCH ASSEMBLY FOR TRACTOR-TRAILER
UNIT
Andrew J. Allen, Washington, Ill., assignor to Caterpillar Tractor Co., Peoria, Ill., a corporation of California
Filed Jan. 14, 1966, Ser. No. 520,728
1 Claim. (Cl. 280—423)

ABSTRACT OF THE DISCLOSURE

Hitch assembly for a tractor-trailer unit wherein the hitch assembly provides for universal movement of the trailer with respect to the tractor about three different axes and wherein the forward end of the trailer is pivotally mounted on the tractor to provide a low center of gravity for greater stability and in a manner such that the weight of the trailer and its load increases the ground pressure of the tractor to provide increased traction.

---

This invention relates to a hitch assembly for a tractor-trailer unit wherein the forward end of the trailer is pivotally mounted on the tractor to provide a low center of gravity for greater stability and in a manner such that the weight of the trailer and its load increases the ground pressure of the tractor to provide increased traction therewith. More particularly, the invention relates to a tractor-trailer unit wherein the forward end of the trailer is pivotally mounted on the tractor forward of and below the rotational axis of the rear tractor wheels.

In many tractor-trailer combinations the trailer is a two-axle unit which may be detached from the tractor and is towed thereby through a drawbar connection. Such arrangements have the disadvantage that the weight of the trailer and its load is not transferred to the tractor for tractive purposes and the front trailer axle adds additional weight to the overall combination.

The principal object of the present invention is to provide a hitch assembly between a two-wheel trailer and a tractor in which the load imposed by the trailer on the tractor is well distributed on the ground engaging portion of the tractor and lowers the center of gravity of said tractor.

The foregoing and other objects and advantages are set forth in the following specification wherein reference is made to the accompanying drawing illustrating a preferred embodiment of the invention.

In the drawing:

FIG. 1 is a schematic illustration, having some parts partially broken away, of a tractor-trailer unit having a hitch assembly constructed in accordance with the invention; and, FIG. 2 is a cross-sectional view taken on the line II–II of FIG. 1.

Referring to FIG. 1, the forward end of a trailer taking the form of a scraper 10 is mounted to the rear portion of a tractor 12 by means of a hitch assembly generally denoted at 13. The tractor 12 is a track-type vehicle but the hitch assembly 13 has equal application with respect to wheeled vehicles and the like. The upper portion of the hitch 13 comprises a conventional tractor A-frame member 14 which is connected by a vertically disposed pivot 16 to the forward end of a trailer gooseneck 18. Member 14 has a bifurcated end 20 which is pivotally mounted to the mid-portion of a horizontally extending spreader tube 22 by means of a horizontal pivot pin 23 (FIG. 2) extending through the midportion of the tube 22 at an angle normal thereto. Stop members 24, formed on member 14, are adapted to contact tube 22 to limit pivotal movement of member 14.

A pair of arms 25 are attached to the outer ends of spreader tube 22 and extend downwardly where their lower ends are pivotally connected by pins 26 to brackets 28 which are rigidly secured to longitudinally extending main frame members 30 located on each side of the tractor. As shown in FIG. 1 the pivotal connections 26 between arms 25 and tractor 12 are disposed forward of and below the rotational axis 32 of a driven sprocket 34 which with an identical sprocket on the opposite side serves as a drive means for the continuous tracks 36 located on each side of the tractor. Stop blocks 38 and 39 are rigidly secured to the main frame members 30 to limit the pivotal movement of the arms 25.

The pivotal connections 26 are located so as to distribute the scraper weight and load along the entire length of the tractor tracks to provide maximum traction with the ground. The location of the pivotal connections 26 also serves to lower the center of gravity and thereby provide greater stability for the tractor.

For the purpose of this description and the ensuing claims the terms sprocket and wheel are to be considered synonymous since the invention is disclosed with but not limited to use with a track-type tractor.

I claim:

A tractor-trailer unit wherein the trailer is supported adjacent its rear end by wheels and adjacent its forward end by a hitch assembly with the tractor, said tractor having track-type ground engaging means and rear drive sprockets for moving the tracks, said hitch assembly having pivotal connections to the tractor forward of the rear drive sprockets and below the rotational axis thereof for supporting the weight of the trailer and lowering the center of gravity of the loaded tractor and to further distribute the trailer weight along the entire ground-engaging portion of the tracks to provide increased traction, said pivotal connections comprising a pair of horizontally disposed coaxial pivot pins each attached to one of a pair of spaced-apart, parallel longitudinally extending tractor frame members at an angle normal thereto, a pair of vertically extending arms, each arm having a first end pivotally mounted on one of said pivot pins, stop blocks secured to the tractor frame on each side of said arms to limit the pivotal movement of the arms, a horizontally disposed tube interconnecting the second ends of said arms, a longitudinal pivot pin supported by the middle portion of said tube at an angle normal thereto, a frame member pivotally mounted on said longitudinal pivot pin and extending outwardly from said arms, stop means formed on said frame member for contacting said tube to limit pivotal movement of said frame member, said frame member having a vertically disposed pivot on which the forward end of said trailer is mounted.

References Cited

UNITED STATES PATENTS

| 1,377,609 | 5/1921 | Townsend | 280—496 |
| 1,990,731 | 2/1935 | Greer | 280—423 |
| 2,091,009 | 8/1937 | Osman | 280—492 |
| 2,488,676 | 11/1949 | Mayner et al. | 280—492 X |

FOREIGN PATENTS

| 957,544 | 5/1964 | Great Britain. |

LEO FRIAGLIA, *Primary Examiner.*